United States Patent
Rajamani et al.

(10) Patent No.: US 11,023,288 B2
(45) Date of Patent: *Jun. 1, 2021

(54) CLOUD DATA CENTER WITH REDUCED ENERGY CONSUMPTION

(71) Applicant: International Business Machines Corporation, Armonk, NY (US)

(72) Inventors: Karthick Rajamani, Austin, TX (US); Malcolm S. Allen-Ware, Tucson, AZ (US); Charles Lefurgy, Austin, TX (US); Guillermo Jesus Silva, Cedar Park, TX (US); Joshua Ian Harriman, Littleton, MA (US); Amos A. Omokpo, Richmond, TX (US); Daniel Dean Heimsoth, Cary, NC (US); Rohith Ravindra, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/502,267

(22) Filed: Jul. 3, 2019

(65) Prior Publication Data

US 2020/0310886 A1 Oct. 1, 2020

Related U.S. Application Data

(63) Continuation of application No. 16/365,758, filed on Mar. 27, 2019.

(51) Int. Cl.
  *G06F 9/46* (2006.01)
  *G06F 9/50* (2006.01)
  *G06F 9/455* (2018.01)

(52) U.S. Cl.
  CPC ........ *G06F 9/5094* (2013.01); *G06F 9/45558* (2013.01); *G06F 9/5005* (2013.01);
  (Continued)

(58) Field of Classification Search
  CPC ........................................................ G06F 9/52
  (Continued)

(56) References Cited

U.S. PATENT DOCUMENTS

| | | | |
|---|---|---|---|
| 6,795,928 B2 * | 9/2004 | Bradley | G06F 1/206 713/320 |
| 7,743,001 B1 * | 6/2010 | Vermeulen | G06Q 30/0283 705/400 |

(Continued)

OTHER PUBLICATIONS

Hsu, Chang-Hong, "Towards Power and Energy Efficient Datacenters", A dissertation submitted in partial fulfillmeni of the requirements for the degree of Doctor of Philosophy (Computer Science and Engineering) in The University of Michigan 2018, 155 pages.

(Continued)

*Primary Examiner* — Mehran Kamran
(74) *Attorney, Agent, or Firm* — David B. Woycechowsky (57) ABSTRACT

Technology for computing number of active servers needed over time in a cloud/compute cluster includes the following operations (not necessarily in the following order): (i) determining the capacity of each VCE provisioned on the cloud against the resource guaranteed to that VCE; (ii) forecasting the resource needs over time using historical requests for each VCE flavor; and (iii) using the forecasted resource needs to determine the required number of future servers at some future time. Some embodiments of the present invention use a formula that accounts for the interplay among various parameter values of the VCE flavors and also the mapping of the needs of VCEs of various flavors to the capabilities of physical resources.

5 Claims, 4 Drawing Sheets

(52) U.S. Cl.
CPC ............. *G06F 2009/45595* (2013.01); *G06F 2209/5011* (2013.01)

(58) Field of Classification Search
USPC ........................................................ 718/104
See application file for complete search history.

(56) References Cited

U.S. PATENT DOCUMENTS

| | | | | |
|---|---|---|---|---|
| 8,230,249 | B2* | 7/2012 | Dasgupta | G06F 9/5094 713/323 |
| 8,341,628 | B2* | 12/2012 | Arndt | G06F 9/45541 718/1 |
| 8,381,002 | B2* | 2/2013 | Nayar | G06F 1/3203 713/320 |
| 8,423,811 | B2 | 4/2013 | Nayar | |
| 9,625,987 | B1* | 4/2017 | LaPenna | G06F 1/3287 |
| 10,042,410 | B2* | 8/2018 | Malik | G06F 1/329 |
| 10,042,676 | B1* | 8/2018 | Wei | G06F 9/5077 |
| 10,680,969 | B1* | 6/2020 | Quinn | G06F 9/45558 |
| 2003/0079151 | A1* | 4/2003 | Bohrer | G06F 1/3209 713/320 |
| 2004/0143664 | A1* | 7/2004 | Usa | G06F 9/5077 709/226 |
| 2006/0184287 | A1* | 8/2006 | Belady | G06F 1/3287 700/291 |
| 2008/0172672 | A1* | 7/2008 | Logan | G06F 9/5077 718/104 |
| 2009/0187782 | A1* | 7/2009 | Greene | G06Q 30/0283 713/340 |
| 2009/0222562 | A1* | 9/2009 | Liu | H04L 67/1002 709/226 |
| 2010/0107159 | A1* | 4/2010 | Radhakrishnan | G06F 9/5055 718/1 |
| 2010/0199285 | A1* | 8/2010 | Medovich | G06F 9/455 718/104 |
| 2010/0218005 | A1* | 8/2010 | Jain | G06F 9/5094 713/300 |
| 2011/0029970 | A1* | 2/2011 | Arasaratnam | G06F 9/45558 718/1 |
| 2011/0072138 | A1* | 3/2011 | Canturk | G06F 9/5011 709/226 |
| 2011/0302578 | A1* | 12/2011 | Isci | G06F 9/5077 718/1 |
| 2012/0030685 | A1* | 2/2012 | Jackson | G06F 9/5027 718/104 |
| 2012/0117399 | A1* | 5/2012 | Chan | G06F 1/3234 713/320 |
| 2012/0179446 | A1* | 7/2012 | Tylutki | G06F 11/3442 703/21 |
| 2013/0080809 | A1* | 3/2013 | Lu | G06F 1/324 713/322 |
| 2013/0185717 | A1* | 7/2013 | Lakshminarayanan | G06F 9/45558 718/1 |
| 2013/0261826 | A1* | 10/2013 | Mandagere | G06F 1/329 700/291 |
| 2013/0290598 | A1* | 10/2013 | Fiske | G06F 3/068 711/103 |
| 2014/0215464 | A1* | 7/2014 | Birke | G06F 11/3006 718/1 |
| 2014/0298349 | A1* | 10/2014 | Jackson | G06F 1/329 718/104 |
| 2015/0006940 | A1* | 1/2015 | Kim | G06F 1/26 713/340 |
| 2015/0039764 | A1* | 2/2015 | Beloglazov | G06F 9/5088 709/226 |
| 2015/0058641 | A1* | 2/2015 | Parikh | G06Q 50/06 713/300 |
| 2015/0312167 | A1* | 10/2015 | Blagodurov | G06F 9/5094 709/226 |
| 2016/0070602 | A1* | 3/2016 | Shimogawa | G06F 9/45558 718/1 |
| 2016/0162308 | A1* | 6/2016 | Chen | G06F 9/45558 718/1 |
| 2016/0378532 | A1* | 12/2016 | Vincent | G06F 9/4856 718/1 |
| 2017/0093639 | A1* | 3/2017 | Dabbagh | H04L 41/0896 |
| 2018/0097744 | A1* | 4/2018 | Hu | H04L 67/1002 |
| 2018/0107503 | A1* | 4/2018 | MacHida | G06F 9/50 |
| 2018/0225137 | A1* | 8/2018 | Bianchini | G06F 9/5005 |
| 2018/0225149 | A1* | 8/2018 | Bianchini | G06F 9/5077 |
| 2018/0276038 | A1* | 9/2018 | Malik | G06F 9/45558 |
| 2018/0287955 | A1* | 10/2018 | Fitzgerald | G06F 9/5083 |
| 2018/0295026 | A1* | 10/2018 | Jones | G06F 9/547 |
| 2019/0213027 | A1* | 7/2019 | Bhandari | G06F 9/452 |
| 2019/0278620 | A1* | 9/2019 | Korbar | H04L 41/12 |
| 2019/0286494 | A1* | 9/2019 | Sampson | G06F 9/45533 |
| 2019/0324819 | A1* | 10/2019 | Zeng | G06F 9/5072 |

OTHER PUBLICATIONS

Rajamani et al., "Cloud Data Center With Reduced Energy Consumption", U.S. Appl. No. 16/365,758, filed Mar. 27, 2019, 35 pages.

Appendix P—List of IBM Patents or Patent Applications Treated as Related, Filed herewith, 2 Pages.

* cited by examiner

CLOUD DATA CENTER WITH REDUCED ENERGY CONSUMPTION

BACKGROUND

The present invention relates generally to the management of cloud computer systems.

Cloud computer systems (herein sometimes more simply referred to as "clouds") are known. The Wikipedia entry for "cloud computing" (as of 12 Jan. 2019) states as follows: "Cloud computing metaphor: the group of networked elements providing services need not be individually addressed or managed by users; instead, the entire provider-managed suite of hardware and software can be thought of as an amorphous cloud. Cloud computing is shared pools of configurable computer system resources and higher-level services that can be rapidly provisioned with minimal management effort, often over the Internet. Cloud computing relies on sharing of resources to achieve coherence and economies of scale, similar to a public utility. Third-party clouds enable organizations to focus on their core businesses instead of expending resources on computer infrastructure and maintenance. Advocates note that cloud computing allows companies to avoid or minimize up-front IT infrastructure costs. Proponents also claim that cloud computing allows enterprises to get their applications up and running faster, with improved manageability and less maintenance, and that it enables IT teams to more rapidly adjust resources to meet fluctuating and unpredictable demand . . . . The availability of high-capacity networks, low-cost computers and storage devices as well as the widespread adoption of hardware virtualization, service-oriented architecture, and autonomic and utility computing has led to growth in cloud computing."

It is known that cloud data centers consume energy and that it is generally desirable to design cloud data centers to minimize energy consumption in ways that are consistent with performance requirements.

Virtualized computing environments (VCEs) are known. VCEs can be stored as "images." A new active instance of the VCE can be instantiated from the image. Two types of VCEs are virtual machines and containers. A container is a VCE that uses operating-system-level virtualization. This refers to an operating system feature in which the kernel allows the existence of multiple isolated user-space instances, called containers. This isolated user-space instances may look like real computers from the point of view of programs running in them. A computer program running on an ordinary operating system can see all resources (connected devices, files and folders, network shares, CPU power, quantifiable hardware capabilities) of that computer. However, programs running inside a container can only see the container's contents and devices assigned to the container.

The definition of "VCE flavor" will now be given. A "VCE flavor" (for example, VM flavor, container flavor) is a particular VCE configuration specifying values for at least one of the following VCE parameters: (i) number of VCPUs (virtual central processing units); (ii) amount of main memory (that is, storage space available in main memory); (iii) number of virtual connections; (iv) virtual network bandwidth; (v) storage I/O (input/output) bandwidth (remote storage); and/or (vi) number of GPUs (graphics processing units).

SUMMARY

According to an aspect of the present invention, there is a method, computer program product and/or system for use in a data center that uses VCEs to perform computing jobs, where the method/program/system performs the following operations (not necessarily in the following order): (i) receiving a plurality of VCE (virtual computing environment) flavor definitions, with each flavor definition including a VCE parameter value for at least one of the following VCE parameters: (a) number of VCPUs (virtual central processing units), (b) amount of main memory, (c) number of virtual connections, (d) virtual network bandwidth, (e) storage I/O (input/output) bandwidth for remote storage, and/or (f) number of GPUs (graphics processing units); (ii) receiving a historical VCE request data set including a plurality of historical demands demand data set, with each historical demand data set including: (a) a previous demand on the data center to provide a VCE having a VCE flavor value corresponding to one of the VCE flavor definitions, and (b) a time and date when the previous demand was made; (iii) forecasting a forecasted VCE demand value for the data center at a future time based, at least in part, upon the historical VCE request data set; (iv) determining a forecasted server demand value for the data center at a future time based, at least in part, upon the forecasted VCE demand value; (v) determining that a number of servers in a ready status pool of the data center is less than the forecasted server demand value; and (vi) responsive to the determination that the number of servers in a ready status pool of the data center is less than the forecasted server demand value, moving at least one server from an unready status pool to the ready status pool.

According to a further aspect of the present invention, there is a method, computer program product and/or system for use in a data center that uses VCEs to perform computing jobs, where the method/program product/system performs the following operations (not necessarily in the following order): (i) receiving a plurality of VCE (virtual computing environment) flavor definitions, with each flavor definition including a VCE parameter value for at least one of the following VCE parameters: (a) number of VCPUs (virtual central processing units), (b) amount of main memory, (c) number of virtual connections, (d) virtual network bandwidth, (e) storage I/O (input/output) bandwidth for remote storage, and/or (f) number of GPUs (graphics processing units); (ii) receiving a historical VCE request data set including a plurality of historical demands demand data set, with each historical demand data set including: (a) a previous demand on the data center to provide a VCE having a VCE flavor value corresponding to one of the VCE flavor definitions, and (b) a time and date when the previous demand was made; (iii) forecasting a forecasted VCE demand value for the data center at a future time based, at least in part, upon the historical VCE request data set; (iv) determining a forecasted server demand value for the data center at a future time based, at least in part, upon the forecasted VCE demand value; (v) determining that a number of servers in a ready status pool of the data center is greater than the forecasted server demand value; and (vi) responsive to the determination that the number of servers in a ready status pool of the data center is greater than the forecasted server demand value, moving at least one server from the ready status pool to an unready status pool.

According to a further aspect of the present invention, there is a method, computer program product and/or system for use in a data center that uses VCEs to perform computing jobs by performing the following operations (not necessarily in the following order): (i) receiving a plurality of VCE (virtual computing environment) flavor definitions, with each flavor definition including a VCE parameter value for at least one of the following VCE parameters: (a) number of VCPUs (virtual central processing units), (b) amount of main memory, (c) number of virtual connections, (d) virtual network bandwidth, (e) storage I/O (input/output) bandwidth for remote storage, and/or (f) number of GPUs (graphics processing units); (ii) receiving a historical VCE request data set including a plurality of historical demands demand data set, with each historical demand data set including: (a) a previous demand on the data center to provide a VCE having a VCE flavor value corresponding to one of the VCE flavor definitions, and (b) a time and date when the previous demand was made; (iii) forecasting a forecasted VCE demand value for the data center at a future time based, at least in part, upon the historical VCE request data set; (iv) determining a forecasted server demand value for the data center at a future time based, at least in part, upon the forecasted VCE demand value; (v) determining that a first instantiation of a VCE should be migrated from a first server to a second server based on the forecasted server demand value; and (vi) responsive to the determination that a first instantiation of a VCE should be migrated from a first server to a second server based on the forecasted server demand value, migrating the first instantiation of the VCE from the first server to the second server.

DETAILED DESCRIPTION

According to an embodiment of the present invention, a method to compute number of active servers needed over time in a cloud/compute cluster includes the following operations (not necessarily in the following order): (i) determining the capacity of each VCE provisioned on the cloud against the resource guaranteed to that VCE; (ii) forecasting the resource needs over time using historical requests for each VCE flavor; and (iii) using the forecasted resource needs to determine the required number of future servers at some future time. Some embodiments of the present invention use a formula that accounts for the interplay among various parameter values of the VCE flavors and also the mapping of the needs of VCEs of various flavors to the capabilities of physical resources. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
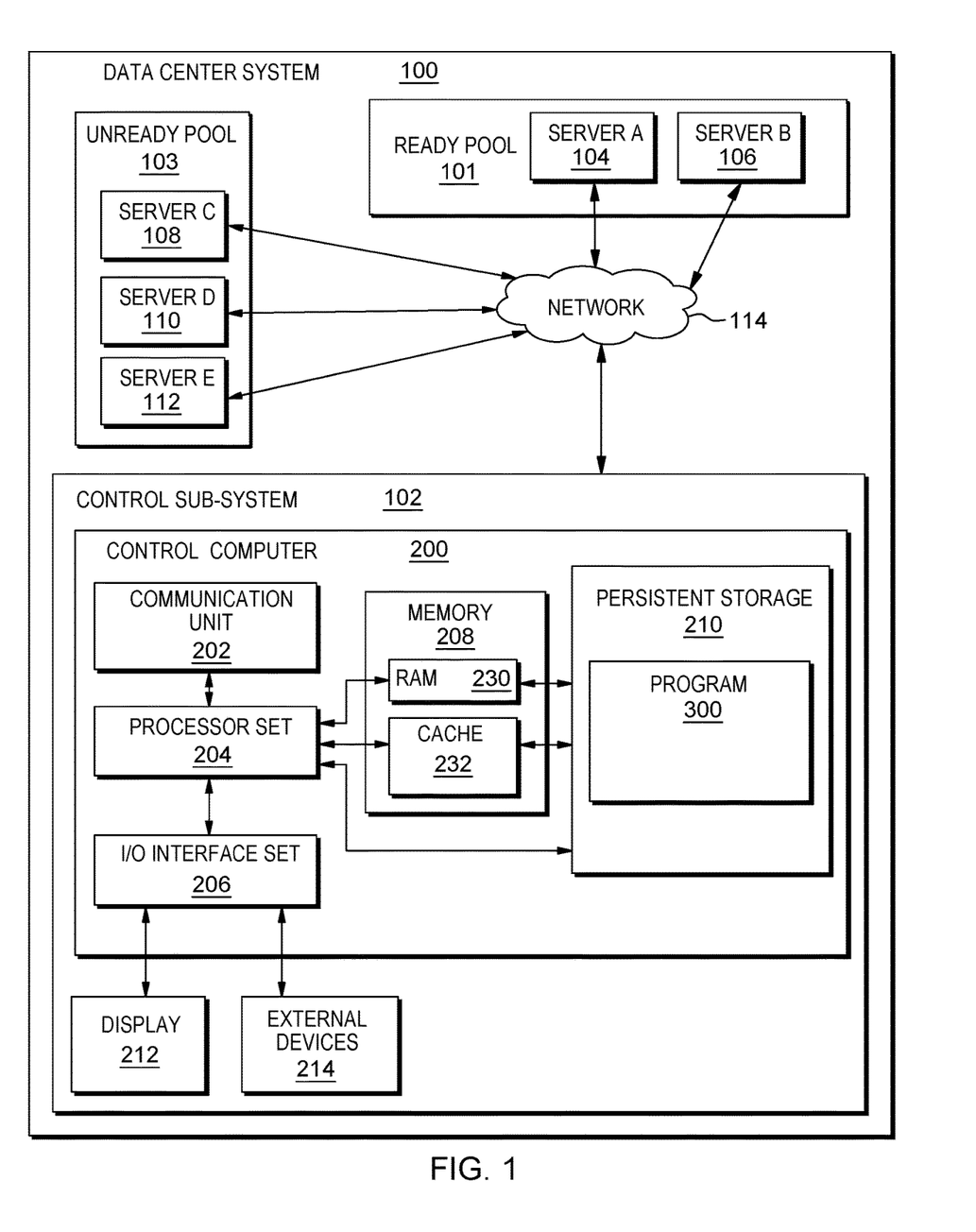
FIG. 1 is a block diagram view of a first embodiment of a system according to the present invention.

An embodiment of a possible hardware and software environment for software and/or methods according to the present invention will now be described in detail with reference to the Figures. FIG. 1 is a block diagram illustrating data center system 100, including: control sub-system 102; ready pool 101; unready pool 103; server A 104; server B 106; server C 108; server D 110; server E 112; communication network 114 (a local area network operating within the data center); control computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
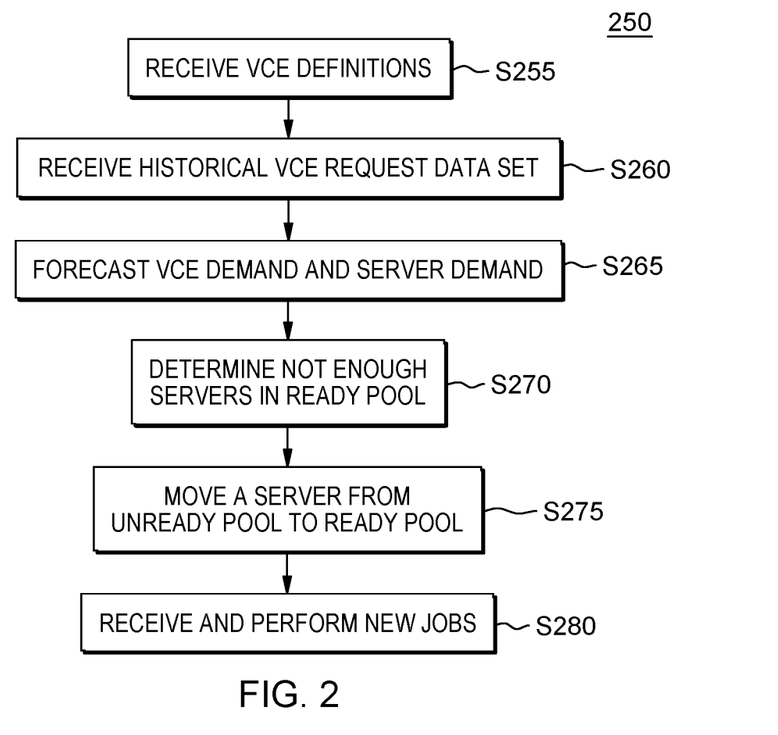
FIG. 2 is a flowchart showing a first embodiment method performed, at least in part, by the first embodiment system.
Figure 3:
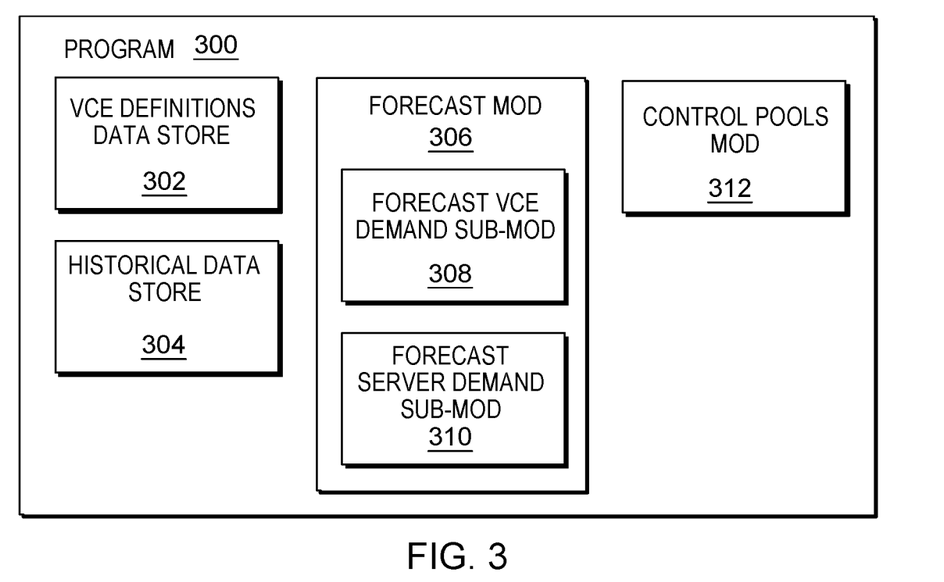
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where VCE definitions data store 302 receives: (i) definitions for various VCE flavors used in data center 100; and (ii) information specifying the various combination of VCE flavors that can be simultaneously run on the various servers 104, 106, 108, 110, 112.

In this simplified example: (i) all of the VCEs are containers (no VMs); (ii) there are three VCE flavors: big, medium and small; (iii) the various VCE flavors are differentiated only by the number of VCPUs used in instantiations mage under the flavor (with big flavor container instantiations having the most VCPUs and small flavor container instantiations having the least VCPUs); (iv) all of the physical servers are identical meaning that they can run the same numbers/combinations of VCE flavors; (v) each server can run only one big flavor container instantiation; (vi) each server can run one big flavor container instantiation and one medium flavor container instantiation; and (vii) each server can run one big flavor container instantiation and two small flavor container instantiations. All of this information is stored in VCE definitions data store 302.

Processing proceeds to operation S260, where historical data store 304 receives a historical VCE request data set. The historical VCE request data set includes requests for the various flavors of container that data center has served in the past and the time/date at which the historical VCE requests were made.

Processing proceeds to operation S265, where forecast module (mod) 306: (i) calculates a forecasted number of each container flavor that will be needed between 9 am and 10 am on Jan. 2, 2019 to perform the jobs coming into data center 100; and (ii) calculates a forecasted number of servers that will be needed between 9 am and 10 am on Jan. 2, 2019 to perform the jobs coming into data center 100.

In this simple example, forecast VCE demand sub-mod 308 of forecast mod 306 forecasts the number of various container flavors that will be needed between 10 am and 11 am on Jan. 2, 2018 by determining the number of various container flavors that were needed between 7 am and 10 am on Jan. 2, 2018 based on the historical data stored in historical data store 304. In many embodiments, the algorithm for forecasting the number of various container flavors will be much more complex (see the next sub-section of this Detailed Description section), and may take into account additional factors beyond the historical requests/use of the various container flavors. Moving back to this simple example, the forecasted VCE demand is: (i) three (3) big flavor container instantiations; (ii) two (2) medium flavor container instantiations; and (iii) zero (0) small flavor container instantiations.

As in the example described in the previous paragraphs, some embodiments use very recent historical data to forecast a forecasted server demand. Alternatively, other embodiments may take into account that server demand tends to vary over the course of a day in a somewhat predictable fashion, and use older historical data, at least to some extent, to help account for expected demand shifts that will occur over the course of a day.

In this simple example, forecast server demand sub-mod 310 of forecast mod 306 forecasts the number of various servers that will be needed between 10 am and 11 am on Jan. 2, 2018 based on: (i) the forecasted VCE demand; and (ii) information about how many containers of each flavor can be run on servers 104, 106, 108, 110, 112. In many embodiments, the algorithm for forecasting the number of servers that will be needed will be much more complex (see the next sub-section of this Detailed Description section). For an example of this complexity, different servers in a data center may be able to simultaneously run different numbers of VCPUs. As a further example of this complexity, container flavor factors other than the number of VCPUs may become relevant in determining the number of servers needed. Moving back to this simple example, the forecasted server demand is three (3) servers because three (3) big flavor container instantiations are forecasted to be needed and each server can simultaneously run no more than one (1) big flavor container instantiations.

Figure 4A:
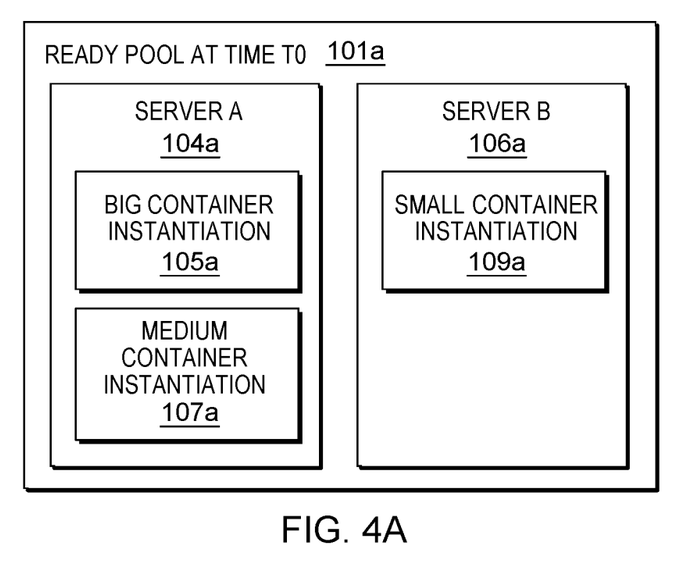
FIG. 4A is a block diagram showing a portion of the first embodiment system at a first time T0.

Processing proceeds to operation S270, where control pools mod 312 determines that at the current time (time=T0), there are only two servers in ready status pool and that this is not enough servers in ready status pool 101 to server the forecasted server demand of three (3) servers for 10 am to 11 am on Jan. 2, 2018. At time T0 (before 10 am on Jan. 2, 2018) two ready status servers 104a and 106a of ready pool 101a are shown in FIG. 4A. At time T0: (i) ready status server A 104a is running one (1) big flavor container instantiation 105a and one medium flavor container instantiation 107a; (ii) ready status server B 106a is running one (1) big flavor container instantiation 109a.

Ready status (that is, the status of servers in ready pool 101) versus unready status (that is, the status of servers in unready pool 103) will now be discussed. Ready status servers are any servers that are immediately ready to instantiate a container to perform an incoming job. Unready status servers are any servers that are not immediately ready to instantiate a container to perform an incoming job. In this example, the unready status servers are all in hibernation mode and all of the ready status servers are running in full power active mode. In other embodiments, the difference between ready status and unready status may be more granulated and/or nuanced (see discussion of the various server sub-pools discussed in the next sub-section of this Detailed Description section). Generally speaking, unready status servers will consume less power than ready status servers. While it is desired to have enough ready status servers to accommodate the container flavors needed to perform ongoing and incoming job requests, it is desired not to have too many ready status servers because this increases energy consumption and energy costs for the data centers.

Processing proceeds to operation S275, where control pools mod 312 moves additional server C 108 from unready pool 103 to ready pool 101 (see FIG. 4B) at 10 am on Jan. 2, 2018. This is because the forecasted server demand is three servers and only two servers were in ready pool 101 before 10 am on Jan. 2, 2018 (see FIG. 4A).

Figure 4B:
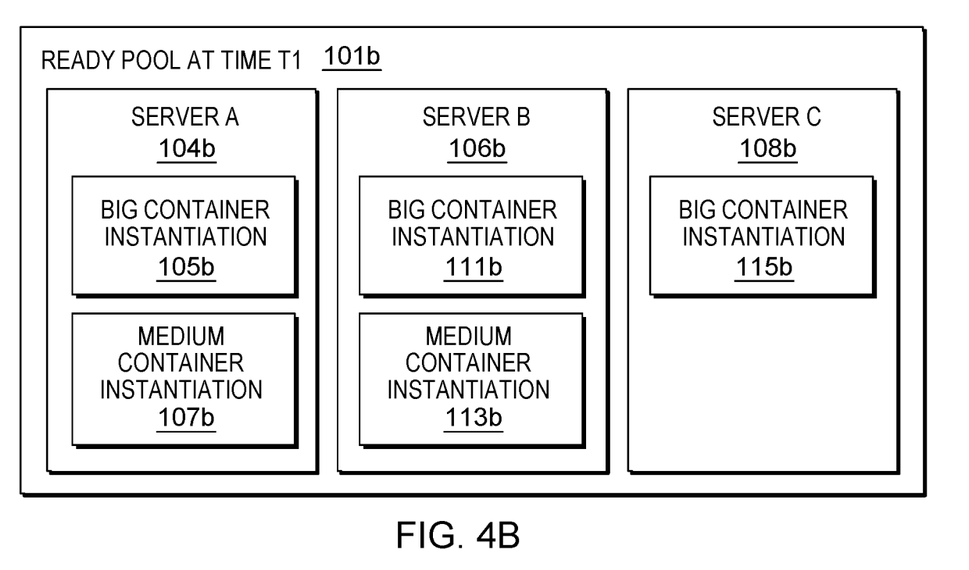
FIG. 4B is a block diagram showing the portion of the first embodiment system at a later time T1.

Processing proceeds to operation S280, where data center 100 continues to perform ongoing jobs that have not been completed and to perform new incoming jobs with new container instantiations of various appropriate flavors. More specifically, at time T1 (after 10 am on Jan. 2, 2018) and as shown in FIG. 4B: (i) server A 104b continues to run an ongoing job using big flavor container instantiation 105b; (ii) server A 104b continues to run an ongoing job using medium flavor container instantiation 107b; (iii) server B 106b has completed the job it was performing at time T0 (see FIG. 4A); (iv) server B 106b starts to run a new job using big flavor container instantiation 111b; (v) server B 106b starts to run a new job using medium flavor container instantiation 113b; and (vi) server C 108b (fortunately added to ready status pool 101) starts to run a new job using big flavor container instantiation 115b.

III. Further Comments and/or Embodiments

Some embodiments of the present invention recognize the following facts, potential problems and/or potential areas for improvement with respect to the current state of the art: (i) power is limited resource in a cloud data center; (ii) idle/underutilized servers consume power that could be utilized better for driving higher performance from active servers or could be put in lower power modes to save energy; (iii) there is need for resources/virtual machines of many different flavors (size of resources) and associated SLA/QoS; (iv) spot market users could accommodate a "compression" of their resource needs (that is, run with less resources then they ask for or with any available resource quantity); (v) guaranteed class users might want a specific resource quantity irrespective of demands from other users and wouldn't tolerate reduction in resources available to them under any condition; and/or (vi) energy reduction at and/or transfer from idle servers needs to be balanced with need to keep servers ready for new jobs and/or incoming work.

Some embodiments of the present invention may include one, or more, of the following features, characteristics, operations and/or advantages: (i) system and method for balancing energy reduction, and/or maximizing useful power, with maintaining adequate reserves of active servers for ongoing, anticipated and/or incoming work; (ii) an approach that uses incoming requests for different VM (virtual machine) flavors to estimate demand for computing resources; (iii) forecasting how many servers are needed over time based, at least in part, on incoming requests for different VM (virtual machine) flavors; (iv) placing an appropriate number of servers in different states of use/readiness/idleness based, at least in part, incoming requests for different VM (virtual machine) flavors; (v) alerting a power management service on change in state of the servers (and associated power consumption levels) to more optimally allocate/distribute power budgets in the data center; and/or (vi) deals with virtual machine requests of different flavors and classes/priorities rather than with web serving/single workload running across a cluster of servers.

Figure 5:
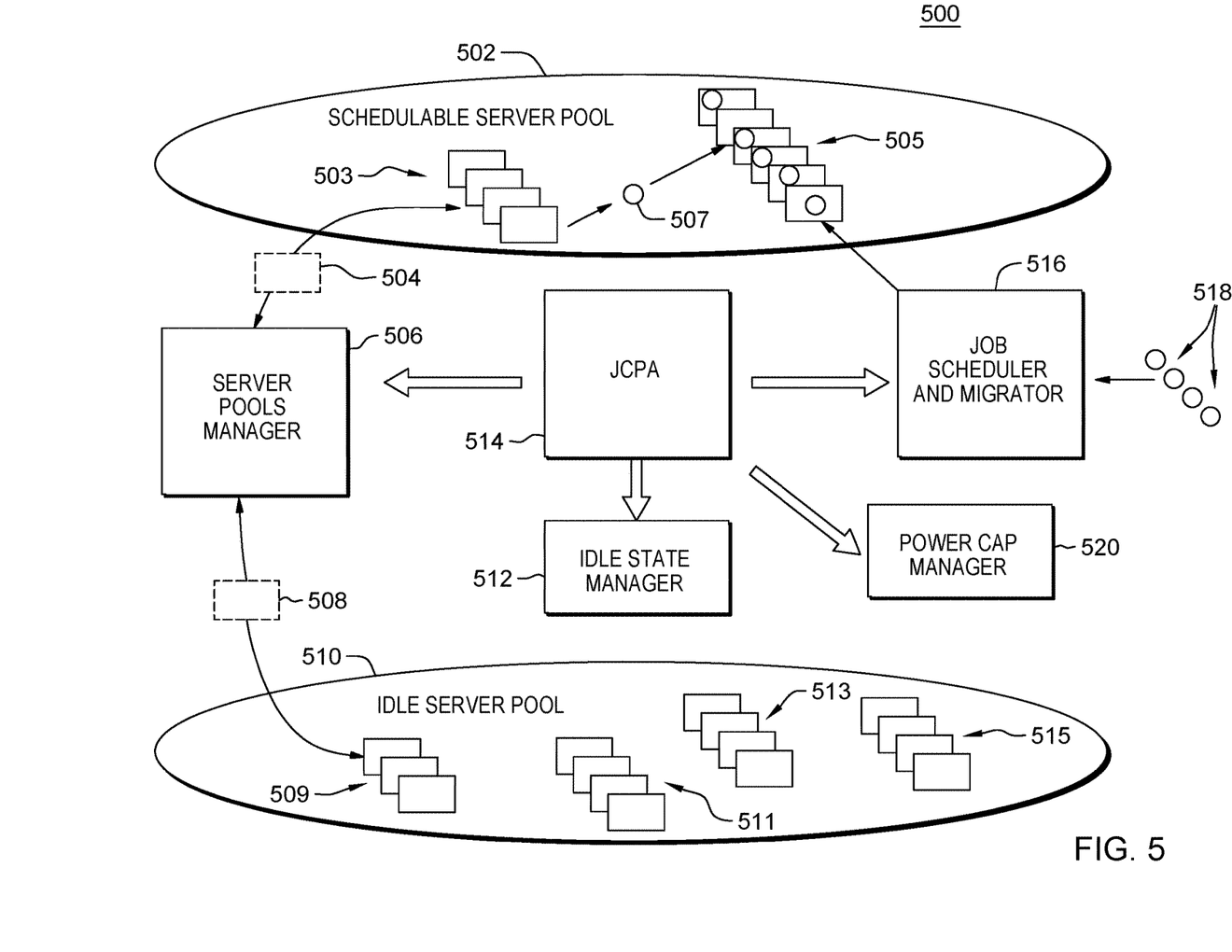
FIG. 5 is a block diagram view of a first embodiment of a system according to the present invention.

FIG. 5 is a block diagram of data center system 500, which balances energy reduction (and/or maximizes useful power) while maintaining adequate reserves of active servers for ongoing, anticipated and/or incoming work. System 500 includes: schedulable server pool 502 (including schedulable idle-on server sub-pool 503, schedulable active server sub-pool 505, and server-under-transfer 507); idle server-being-transferred 504; server pools manager (SPM) 506; idle server-being-transferred 508; idle server pool 510 (including idle-powered-on server sub-pool 509, idle-low-power server sub-pool 511, idle-off server sub-pool 513 and idle-repair server sub-pool 515); idle state manager (ISM) 512; joint consolidation and placement advisor (JCPA) 514; job schedule and migrator (JSM) 516; incoming/migrating job data 518; and power cap manager 520.

The schedulable idle-on server sub-pool 503 and schedulable active server sub-pool 505 of schedulable server pool 502 are each made up of multiple blade server computers (that is multiple, discrete physical computers) secured into racks in a large data center facility. In this embodiment, all of the blade servers are the same make and model of blade server computer. Alternatively, other data center embodiments may have an assortment of different makes and models of physical computer machines in the data center. The computers of the schedulable server pool are generally not physically next to each other in the racks of the data center, but they are all connected in data communication with other components of data center system 500 so that these machines can be managed by other computers and can be used as servers to receive and send data to cloud customer computers that are remote from data center system 500. The thing that the physical servers of schedulable server pool 502 have in common is that they are all (relatively) immediately available to have perform computing tasks (more specifically, cloud computing tasks) for clients and/or customers (more specifically, cloud clients and/or cloud customers).

The servers of schedulable active server sub-pool 505 are: (i) powered on; and (ii) operating in an active mode (that is, not an idle or sleep mode). Many, if not all, of them will also be actively involved in performing cloud computing tasks through virtual machines and/or containers that are running on them. In this embodiment, there is only one speed for active mode. Alternatively, other embodiments may have servers that can be run at more than one active mode speed (note, idle is not considered as an active mode speed here). Because the servers of active server sub-pool 505 are all in active mode, they can immediately have additional VMs, containers and/or computing tasks immediately assigned to them (unless an active server is at full capacity). In general, it is preferred to maintain an active server sub-pool where every physical machine in the active server sub-pool is operating at some proportion of full capacity (for example, 90% of full processing capacity). This is because it is energy efficient to either have a given server: (i) operating at near full capacity to get the work of the data center done, or (ii) put into an idle, sleep or power off mode.

The servers of schedulable idle-on server sub-pool 503 are operating in idle mode. Although, as stated above, these physical servers of sub-pool 503 are relatively immediately available to perform cloud computing tasks, they do need to be switched from idle mode to active mode before they can start to perform cloud computing tasks. As shown in FIG. 5, server-under-transfer 507 is being switched from sub-pool 503 to sub-pool 505 because its mode of operation is being switched from idle to active. In the previous sub-section of this Detailed Description, "ready status" servers were discussed. The servers of sub-pool 503, like the servers of sub-pool 505, have a "ready status" because they are ready to receive new jobs and new VCEs (for example, VMs) of various flavors that are used to perform these new jobs.

Idle server pool 510 is made up of several sub-pools of discrete physical blade server computer machines that are not immediately ready to be assigned cloud computing tasks. In the previous sub-section of this Detailed Description, "unready status" servers were discussed. The servers of the various sub-pools of idle server pool 510 have an "unready status" because they are not ready to receive new jobs and new VCEs (for example, VMs) of various flavors that are used to perform these new jobs. As will be explained in detail, below, many of these machines are operated in lower power consumption modes, or even powered off, so that they do not consume as much power, and thereby allow data center system 500 to save on energy costs. While it is known, under currently conventional technology, to have an idle server pool like pool 510, the on-going allocation and re-allocation of servers as between pool 502 and pool 510 is handled in novel way(s) according to various embodiments of the present invention, as will be further explained, below.

Idle-powered-on server sub-pool 509 is made up of physical discrete server computer machines that are powered on, but are in an idle mode of operation. Because the servers of sub-pool 509 are in idle mode, they consume less power. Idle-low-power server sub-pool 511 is made up of physical discrete server computer machines that are powered on, but are in a low power variant of the idle mode of operation so that these servers consume even less power than the servers of sub-pool 509. This way these blade server machines consume even less power, but can still be brought up to an active state more quickly than if they were completely powered down. Idle-off server sub-pool 513 is made up of server computer machines that are fully powered down. This minimizes the amount of energy consumed by these machines, but it does increase the amount of time required to boot up these machines and bring them into an active state when they become needed.

Idle-repair server sub-pool 515 is a sub-pool of server computer machines that is undergoing repair to their software, hardware and/or firmware. For example, machines in need of a software patch for security purposes may be placed into sub-pool 515. When the repairs are completed on a computer then it can be re-allocated to the most appropriate one of sub-pools 509, 511 or 513.

Server pools manager (SPM) 506 is the module (see, DEFINITIONS sub-section, below) that has the machine logic for allocating the various computers of data center system 500 into sub-pools 503, 505, 509, 511, 513 or 515 on an on-going basis. For example, as shown in FIG. 5, idle server-being-transferred 504 is being re-allocated by SPM 506 from sub-pool 509 to sub-pool 503. As a further example, idle server-being-transferred 508 is being re-allocated by SPM 506 from sub-pool 503 to sub-pool 509.

ISM 512 is a module that includes machine logic for managing the four sub-pools of idle server pool 510.

JSM 516 is a module that includes machine logic for scheduling and migrating various cloud computing tasks that are being performed by the computers of data center system 500. For example, incoming/migrating job data 518 is the input data that is to be used to perform cloud computing tasks. After these tasks are performed, the output data will be sent back out to computers of clients and/or customers (not shown in FIG. 5).

Power cap manager 520 is a module that includes machine logic for managing a power cap for the cloud data center system.

In this embodiment JCPA 514 performs the following operations: (i) monitors key metrics; (ii) determines and/or estimates which VM flavors (in the schedulable server pool and/or in the idle pool) will be needed to perform incoming jobs; (iii) computes necessary number of schedulable servers needed (both immediately and in the near future; (iv) instructs and/or hints JSM 516 to vacate jobs from certain (number of) servers if more than necessary servers are found in schedulable server pool 502; (v) instructs SPM 506 to move certain (number of) servers between the schedulable and idle pools; (vi) instructs ISM 512 to move servers in idle server pool to different levels of readiness and/or power; and (vii) raises alerts when servers need to be added and/or fixed.

With respect to the metrics mentioned in item (i) in the list of the previous paragraph, the metrics and input used by JCPA 514 in this embodiment includes: (a) number of servers in each of the sub-pools 503, 505, 509, 511, 513 and 515; (b) unallocated space (resources) on every server in active server sub-pool 505 of schedulable server pool 502; (c) current load (usage of allocated resources) on servers of active server sub-pool 505; (d) constraints and guidelines in terms of desired load targets for different flavor classes and running on various types of servers; (e) time required to transition servers between operational modes (for example, power off to idle, idle to active); and/or (f) time required to move servers from pool 510 to pool 502. Using these various inputs, the machine logic of JCPA determines estimated demand in terms of flavors in near future. In this embodiment, the estimated demand includes quantities (for example, quantities of each flavor of VCE that system 500 is set up to create and use to perform jobs) and rates (for example, rates of processor cycles, rates of storage ingestion, rates of network data communication).

An example of the machine logic of JCPA 514 using of metrics, demand and transition time delays will now be discussed. Variable definitions for this example are as follows: (i) Fi means the ith flavor of the multiplicity of available flavors (ii) Ci resource capacity for flavor I; (iii) Ni is the number of scheduled flavor i's; (iv) Di(t) is additional demand for flavor i (over and above Ni); (v) Cs resource capacity of a server; (vi) cFi is compressible Flavor I; (vii) cCi is resource capacity for compressible flavor i; (viii) cNi is the number of scheduled cFi's (ix) cUi is average utilization for compressible flavor I; (x) cDi(t) is additional demand for compressible flavor I; (xi) tUi is target oversubscription for compressible flavor i (>1); and (xii) SD(t) is computed server demand.

Using the input metrics identified in the previous paragraphs, JCPA 514 uses the following equation:

$$SD(t=t')=(\Sigma Di(t=t')+Ni)*Ci+\Sigma[(Cdi(t=t')+Cni*cUi)/tUi)*cCi/Cs]$$

SD can be evaluated for each additional delay period (t') for changing an idle pool server to a schedulable server. JCPA 514 further uses the following equation and associated logic: N_migrate(t<=t')=SD(t=t')−(N_aS+N_iS), where N_migrate is the number of servers that need to be moved between the ready and unready pools, at some t before or equal to t', N_aS—number of active servers at the time of evaluation in the ready pool and N_iS is the number of idle servers at the time of evaluation in the ready pool (together they make up the size of the ready pool).

```
IF N_migrate < 0 MOVE_SStoIS(N_migrate)
ELSE IF N_migrate > 0 MOVE_IStoSS(N_migrate).
```

In the logic of the previous paragraph, MOVE_IStoSS will cause JCPA 514 to instruct ISM 512 and/or server pools manager 506 to wake up and activate servers from idle server pool 510 pool as needed and move them to schedulable server pool 502. MOVE_SStoIS will cause JCPA 514 to instruct ISM 512 and/or server pools manager 506 to move servers from schedulable server pool 502 to idle server pool 510 and their placement in suitable idle power modes by ISM 512.

Each flavor has a capacity requirement on potentially multiple resource dimensions. In this embodiment, these dimensions include: (i) number of VCPUs (virtual central processing unit); (ii) amount of main memory; (iii) number of virtual connections; (iv) virtual network bandwidth; (v) storage I/O (input/output) bandwidth (remote storage); and (vi) number of GPUs (graphics processing units). The required number of servers to be in a ready status is computed, by JCPA 514, by iterating over each of these resource dimensions. Some additional capacity in servers might be needed to account for usual fragmentation of resources that occurs in practice.

JCPA/PM (power management) and JSM interaction will now be discussed. Server states (that is, which pool 502 (ready) or 510 (unready)) are communicated to the JSM. JSM maintains a list of active servers and dynamically adds and subtracts servers from the list based on communicated state. JSM uses internal list of active servers to schedule jobs to those servers based on factors including the following: available CPUs; available memory; available network; available NUMA (non-uniform memory access) regions; and available GPUs.

Data center power management controllers (PCM, in short for Power Cap Manager, such as CapMaestro) can manage the total power of the data center while allowing servers to get good performance within specified power limits. To do so, they apply power capping loops which need to know the server power characteristics like minimum power (pcap_min) and maximum power (pcap_max) server can consume under capping. When the ISM alters the power states of servers the knowledge of that would be useful for PCM to decide how much additional power it can provide the active servers. Similarly, if PCM is running close to maximum allowed power for the whole data center it may not be useful to add more servers to the active server pool. Additionally, if it is running close to the limit allowed for a particular rack the JCPA may not want to add more active servers in that rack but could do so elsewhere. So, the information related to both conditions could be useful for JCPA to know to decide which servers (depending on their placement in relation to the power limits and consumption) to move from ready to unready pool and vice versa. In this context, JCPA and data center power controllers are subject to the following method: (i) JCPA can optionally obtain power consumption and constraint (limit) information from data center power controllers (PCM); (ii) coordinate idle state transitions of servers and exchange of associated information between ISM and PCM to maximize useful power utilization; and (iii) coordinate where jobs are placed/moved to by JSM to ease/improve PCM effectiveness.

As described in the previous paragraph, the interaction between power cap manager and the elements of our current application come about when the idle servers are placed in low power modes. Some examples of benefits from the interactions will be discussed in the following two paragraphs.

The power consumption levels of these servers are altered when that is done, and this changes some of the critical assumptions the power cap manager has to make in doing its job. A simple example: If a rack branch circuit has a power limit of 9.56 KW (30 A circuit at 80% rating: 230V*30 A*0.8*sqrt(3)) with 12 servers each with pcap_max=1 KW (maximum power under capping) and pcap_min=300 W (minimum power under capping) and idle low power=10 W. If 3 or more servers are in idle low power mode, then the power manager need not bother capping the rest of the servers even under maximum load for them (say its 3 idle servers, then 9*1 KW<(9.56 KW−3*10 W)). However, if they are not in idle low power mode, but just idle then the power cap manager needs to watch and control the consumption on all the servers such that the total doesn't exceed the circuit limit and for this, it cannot let the total power on the 9 active servers exceed 9.56 KW−3*300 W=8.66 KW, as the idle servers can get load placed on them without any coordination with the power manager. The PCM needs to know when the ISM places idle servers in idle low power mode and when they are back to idle and available for scheduling, so it can use either 10 W or 300 W as allocation for that server to decide on available power for the active servers.

If the JSM knows that the load on one branch circuit is 9.3 KW (against a power limit of 9.56 KW for 30 A rated circuit—see calculations, above) from the PCM, whereas the load on another circuit is 4 KW (against 6.37 KW for a 20 A rated circuit), then it is likely to place new requests for VMs/containers in a rack fed to the second circuit rather than the first circuit (even though the latter has a lower limit) as there is lot more power headroom on the second circuit. More the power headroom there are, the less likely the load will need to be power capped any time soon. Under the same limit and consumption situation, say that the JCPA decides more servers need to be brought out from idle to active to service forecast demand, knowing the power limits and consumption from the PCM will help it decide to bring a server from idle low power mode in the second rack rather than in the first rack.

Some embodiments of the present invention may include one, or more, of the following features, characteristics, operations and/or advantages: (i) method for reducing energy consumption in the data center by estimating number of active servers needed (potentially as a function of time); (ii) moving nodes between ready status and unready status pools (for example, active and idle pools); (iii) transitioning idle servers to appropriate low power (active) modes to reduce energy (get them available for jobs to be deployed); (iv) using one, or more, parameters as input for the estimation of number of active servers needed: (a) demand forecast for resources for VM instances/flavors, (b) different classes (that is, relative priority values) of users, (c) resource utilization measures from existing jobs and forecast for incoming ones, (d) node allocation status, (e) node idle mode status and/or server pool membership, (f) constraints (thresholds) on resource oversubscription (resource utilization), (g) fragmentation in node resources, and/or (h) node state transition times (between idle states and from idle-on to ready-for-use; (v) nodes in excess of the estimated number of active ones needed are made idle by migrating jobs off of them to other active ones; (vi) in response to moving nodes between ready status and unready status pools (for example, active and idle pools), informing the data center power cap management solution of pertinent changes in power characteristics of the relevant servers (like pcap_max, pcap_min); and/or (vii) the transitions referred to in the idle mode to transition to is chosen based on the latency to transition between modes (idle-on to off and idle to active) and demand-over-time of active servers.

Some embodiments of the present invention may include one, or more, of the following features, characteristics, operations and/or advantages: (i) determination of the number of servers needed based on resource usage over time for multiple classes of users/workloads (and how we can use the resource usage metrics for each); (ii) based on explicit resource requirements; (iii) migration of existing loads in order to free up servers; (iv) incorporates interactions with any power cap management solution; (v) addresses how VMs have individual descriptions that impact our ability to pack each physical server with jobs; (vi) factors individual resource requirements of VMs and use them to determine the number of nodes needed, for example: (a) number of VCPUs must be met, (b) amount of memory must be met, (c) number of virtual connections must be met, (d) virtual network bandwidth must be met and/or (e) storage I/O bandwidth must be met; (vii) evaluate the resource requirements on a "per architecture" pool type basis (for example, use of a Broadwell pool, a Skylake pool, a Skylake with GPU pool, a Power9 pool, and a Power9 with GPU pool); (viii) used with power capping technology and power capping settings used by SDP can be changed based on the state the server is in; (ix) migration of jobs as a means to alter the number of servers needed is addressed in the context of a virtualized environments; (x) reduces the power cost for data center as a whole but don't need to know individual workload power costs as an input; (xi) addresses the requirements of virtualized environments where each job comes with different resource requirements which dictate how much overall server capacity is needed at any given time; (xii) does not try to make sure that each operational server has an equal workload; (xiii) employs a predictive algorithm to determine future work; (xiv) considers capacity resources plus compressible resources; (xv) monitors resource usage on the servers for determination of how many servers are needed in the main or tail server pools; (xvi) use of job migration as a means to alter load on servers; (xvii) dynamically allocates servers between pools; (xviii) controls the supply of the servers based on the resource demand (for virtual server instances); (xix) minimizes the total cost of servers across each pool over time to increase margin; (xx) looks at clusters of machine subject to non-deterministic physical server provisioning in pools; and/or (xxi) is cloud aware.

Some embodiments of the present invention may include one, or more, of the following features, characteristics, operations and/or advantages: (i) managing pools of physical servers on which VMs (or other VCEs) are scheduled so that energy can be saved without impacting the VMs' need for physical resources; (ii) determining number of physical server needed to support estimated resource needs of VMs as jobs for the cluster (not jobs serviced by network of VMs as in their context) and managing server pools and their states based on that; (iii) prediction of future server needs; (iv) in addition to resource utilization on servers, also uses as an input the request stream for resources in the form of VM flavors that are being asked to be provisioned by users; (iv) depending on the class of users supported by the cloud the actual utilization of resources by them may or may not be the critical factor for determining future resource needs; (vii) by using both (demand for resources and actual usage of them) there may result improved prediction of future needs to meet the diverse QoS needs supported by modern cloud infrastructure/platforms; and/or (viii) leverage server need prediction to reduce the cluster energy consumption.

Some embodiments of the present invention may include one, or more, of the following features, characteristics, operations and/or advantages: (i) depending on the class of users supported by the cloud the actual utilization of resources by them means that in a public cloud you can have multiple classes of users or (better worded) types of VM instances with different SLAs (service level agreements) (for example, a guaranteed class/type instance for which the resources specified (like 3.5 GHz POWER8 4 VCPUs, 32 GB memory, 10 Gbps network bandwidth)) are expected by the user to be available even when the user is not using anyway close to the requested capacity; (ii) any spike in load for services running in the VM can be quickly serviced spot market class/type instance for which the resources specified are provided on a best-effort basis usually at lower cost; (iii) when it is not desirable to use the actual utilization of the requested resources to determine how much physical resources need to be available for anticipated new requests of that type, but, rather, physical resources should be set aside for expected resource requests; and/or (iv) in some situations, the provider could use the actual utilization of requested resources into account to decide on potential oversubscription of resources if spot market users in recent history are using only 50% of their cpu requests, then to keep only enough servers on to accommodate 50% (or 60% with some buffer) of the requested resources.

The term "demand for resources" will now be explained in detail. Each VM instance flavor has specific values attached for each resource—e.g. "Large" instance with resource values 32 VCPUs, 256 GB, 10 Gbps, "Small" instance of with resource values 4 VPCUs, 16 GB, 1 GBps.

The term "actual usage of resources" will now be explained, along with the difference between "actual usage of resources" and "demand for resources." For the provisioned VMs, while their limits might be set by the resources they demand, their actual usage might be <100% of them. For example, a running "Large" instance might be using only 50% of its allocated VCPUs, 20% (0.2*256 GB=51.2 GB) of its allocated memory and 20% of its network bandwidth. Assume there are 20 "Large-guaranteed" instances, 30 "Small-guaranteed" instances provision in the cluster, 10 "Large-best-effort" instances, 10 "Small-best-effort" instances all provisioned in one cloud cluster. Let additional requests for 10% more of each instance type is expected in the next interval and let the observed resource utilization be at 20% for all instance types. Then "demand" resource values are used for the guaranteed types and the demand*utilization (actual) resource values for the best-effort types to compute estimated resource needs for the next interval. So CPU capacity required, would be estimated as (20*32+30*4+10*32*20%+10*4*20%)*110%=915.2 VCPUs. If each server had 64 VCPUs, total number of active servers required during next interval would be estimated as 15 servers (plus some more to account for potential fragmentation when assigning VMs to servers).

Some embodiments of the present invention may include one, or more, of the following features, characteristics, operations and/or advantages: (i) a combination of capacity information that is critical in a public cloud environment along with basic utilization information; (ii) a public cloud environment has a diverse set of critical resources that are driven by a variety of independent users creating VMs that place a wide range of variance on the remaining capacity of the critical resources in the cloud; (iii) estimates the number of servers required to cover each of those critical resources and how then to estimate the current active pool that can continue to meet the incoming temporal demands on the cloud from these many different users; (iv) capacity is considered so that the approach does not quickly fail and customers will find they don't have the resources they need when they come to a cloud to rent virtual servers; (v) helps facilitate cloud server systems where VMs are created at a high rate (for example, 3,000 VMs created every 10 minutes); and/or (vi) uses capacity metrics, and not just utilization metrics, to estimate future need for physical servers in a cloud data center.

Some embodiments of the present invention may include one, or more, of the following features, characteristics, operations and/or advantages: (i) uses capacity metrics from VCEs; (ii) uses a general formulas that includes the following two terms: (a) capacity metric; and (b) utilization metric including the level of oversubscription allowed for that key metric; (iii) uses six (6) representative metrics (set forth above in the Background section) that are used to determine a VCE flavor; (iv) system and method for balancing energy reduction (and/or maximizing useful power) with maintaining adequate reserves of active servers for ongoing plus anticipated plus incoming work; (v) uses incoming requests for different VCE flavors to estimate demand for resources and to forecast how many servers would be needed over time; (vi) uses estimated demand to place appropriate number of servers in different states of use/readiness/idleness; (vii) alerts a power management service on change in state of the servers (and associated power consumption levels) to more optimally allocate/distribute power budgets in a data center; and (viii) deals with VCE requests of different flavors and classes/priorities.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) for use in a data center that uses VCEs to perform computing jobs, the CIM comprising:

receiving a plurality of VCE (virtual computing environment) flavor definitions, with each flavor definition including a VCE parameter value for at least one of the following VCE parameters: (i) number of VCPUs (virtual central processing units), (ii) amount of main memory, (iii) number of virtual connections, (iv) virtual network bandwidth, (v) storage I/O (input/output) bandwidth for remote storage, and/or (vi) number of GPUs (graphics processing units);

receiving a historical VCE request data set including a plurality of historical demands demand data set, with each historical demand data set including: (i) a previous demand on the data center to provide a VCE having a VCE flavor value corresponding to one of the VCE flavor definitions, and (ii) a time and date when the previous demand was made;

forecasting a VCE demand value for the data center at a future time based, at least in part, upon the historical VCE request data set;

determining a server demand value for the data center at a future time based, at least in part, upon the VCE demand value;

determining that a number of servers in a ready status pool of the data center is less than the server demand value; and responsive to the determination that determining that a number of servers in the ready status pool of the data center is less than the server demand value, moving at least one server from an unready status pool to the ready status pool;

wherein the forecasting of the VCE demand value includes:

using classes of VCEs being requested or demanded for estimation, and using priorities of VCEs being requested or demanded for estimation, and using resource utilization measures for VCEs, using constraints on resource oversubscription, using constraints on resource utilization, and using fragmentation in node resources.

2. The CIM of claim 1 further comprising:

transitioning servers in the unready status pool to low power modes.

3. The CIM of claim 2 further comprising:

communicating with data center power cap management (PCM) to communicate any changes to power characteristics of servers the unready status pool.

4. The CIM of claim 2 further comprising:

moving some idle servers in unready pool to service migration needs for servers that need to be vacated.

5. The CIM of claim 2 further comprising:

moving some idle servers in unready pool to service migration needs for customers who want to reserve servers for use on a customer's project.

\* \* \* \* \*